May 15, 1962   A. V. BERNSTEIN ETAL   3,034,379
COMPOSITE STEEL SAW BLADES AND METHOD OF MAKING THE SAME
Filed June 15, 1959                                    2 Sheets-Sheet 1
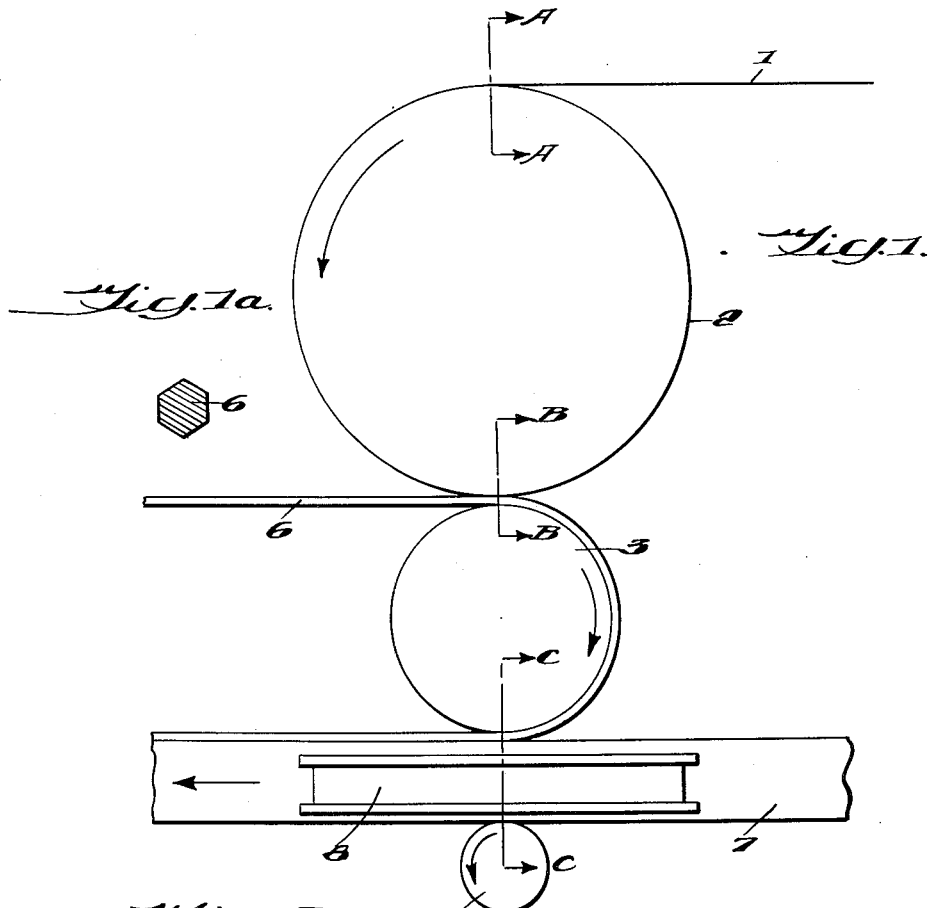
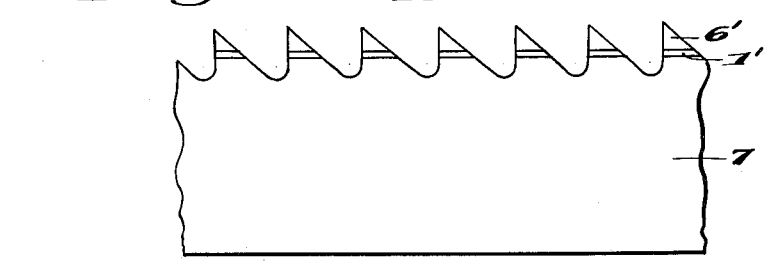
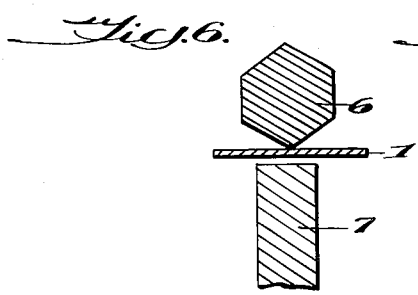
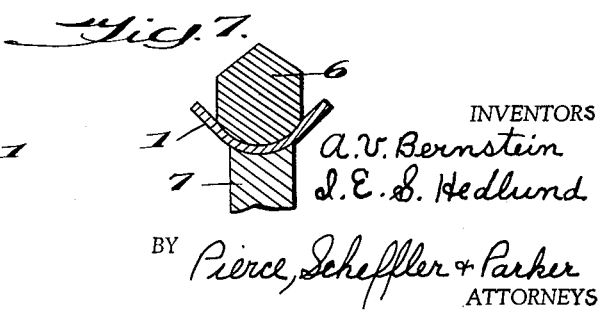
INVENTORS
A. V. Bernstein
L. E. S. Hedlund
BY Pierce, Scheffler & Parker
ATTORNEYS

A-A

B-B

C-C

United States Patent Office 3,034,379
Patented May 15, 1962

3,034,379
COMPOSITE STEEL SAW BLADES AND METHOD OF MAKING THE SAME
Axel Vilhelm Bernstein, Sandviken, and Inge Erik Sigvard Hedlund, Enskede, Sweden, assignors to Sandvikens Jernverks Aktiebolag, Sandviken, Sweden, a company of Sweden
Filed June 15, 1959, Ser. No. 820,541
6 Claims. (Cl. 76—112)

This invention relates to a method for the manufacturing of composite steel saw blades, and more in particular to band saw blades and to the manufacture of such blades.

Metal cutting band saws and hack saw blades made of a homogeneous strip of high speed steel have excellent sawing and wear characteristics. However, under certain sawing conditions such saws and saw blades have a limited life due to fatigue cracks in the gullets. Said cracks will ruin a saw long before excessive wear of the teeth has taken place. Many efforts have been made to overcome this disadvantage in saws made of a homogeneous strip of high speed steel, but the inherent properties of high speed steel is a limiting factor.

It has also been proposed to manufacture saw blades by welding a strip of high speed tool steel to the edge of a disc or a band of common carbon steel or low alloy steel and then to form the teeth by milling and grinding the edge of the high speed tool steel portion of the body thus formed. This method has not proved to be reliable because it results in a non-uniform product. Thus the welding of the high speed tool steel directly to the carbon or low alloy steel results in a welding joint containing hard brittle portions due to a partial melting of the steel during the welding. These hard brittle portions will often be starting points for fatigue cracks. As the teeth also according to this proposal are formed entirely in the high speed tool steel, a bending of the saw blade will result in a premature failure due to fatigue cracks in the gullets.

It is an object of the present invention to provide saw blades which are free of the objectionable characteristics and which avoid the difficulties which have been encountered in the past.

Another object is to provide for the manufacture of composite saw blades having cutting edges of high speed tool steel and a back portion of carbon or low alloy steel in such a manner as to avoid the difficulties referred to above. It is a further object to provide improved composite saw blades and to provide for the manufacture thereof. These and other objects will be in part obvious and in part pointed out below.

According to the present invention a more reliable welding joint is obtained by introducing a thin strip of a heat resistant steel with high hot hardness and low heat conductivity such as an austenitic steel containing at least 12% chromium between the high speed tool steel and the back of a steel with small quantities of alloying elements, and which latter is hereafter referred to as a carbon or low alloy steel.

By the term "high speed tool steel" is meant any of the present-day steel alloys which, in addition to iron and chromium, generally contain tungsten, molybdenum, vanadium, carbon, manganese and silicon such as:

|  | Percent |
|---|---|
| Carbon | 0.75–0.85 |
| Silicon | 0.15–0.35 |
| Manganese | 0.2–0.5 |
| Phosphorus | 0.3 (max.) |
| Sulphur | 0.3 (max.) |
| Chromium | 3.5–4.5 |
| Molybdenum | 4.5–5.5 |
| Tungsten | 6–7 |
| Vanadium | 1.7–2.3 |
| Iron | Balance |

According to another example the high speed tool steel may have the following composition:

|  | Percent |
|---|---|
| Carbon | 0.75–0.85 |
| Silicon | 0.15–0.35 |
| Manganese | 0.2–0.5 |
| Phosphorus | 0.3 (max.) |
| Sulphur | 0.3 (max.) |
| Chromium | 3.5–4.5 |
| Molybdenum | 8–9 |
| Tungsten | 1–2 |
| Vanadium | 0.7–1.3 |
| Iron | Balance |

The characteristics of these and other high speed tool steel, such as the tungsten type containing 18% tungsten, 4% chromium and 1% vanadium e.g. their high hardening temperature are well known in the art.

Referring now to the drawings illustrating an embodiment of the invention:

FIGURE 1 is a schematic view illustrating the welding method according to the invention.

FIGURE 1a is a cross section of a wire of high speed steel.

FIGURE 5 is a side elevation of a section of a composite saw blade.

FIGURES 6 and 7 are schematic views of the wire and strips during the welding operation.

Figure 2:
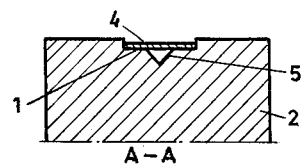
FIGURE 2 is a sectional view on an enlarged scale along the line A—A of FIGURE 1, showing the edge of a roll, at which the thin strip of austenitic steel is brought into contact with a wire of high speed tool steel which is to form the teeth or the tips of the teeth.

Referring to FIGURE 5 of the drawing, the illustrated embodiment of the invention comprises a metal cutting saw band or saw blade which has a back portion 7 consisting of a hardenable steel with good fatigue properties from which the teeth extend. The tip portions 6' of the teeth consisting of high speed tool steel are fastened to the back portion 7 by way of a butt-seam-welding method.

To achieve good properties in the welding joint it has been found to be of great importance to use an intermediate layer 1' consisting of a thin strip of heat resistant steel, with high hot hardness and low heat conductivity in the said welding joint. In this way the hitherto unavoidable hard brittle cast zones or portions at the welding joint between the high speed tool steel and the hardenable steel which often serve as starting points for fatigue cracks are avoided. Furthermore the welding joint according to the invention will be free from pores and oxidized portions.

The intermediate layer to be used should be in the form of a thin strip 1 as shown in the FIGURES 6 and 7. It consists of heat resistant steel with high hot hardness and low heat conductivity. Preferably an austenitic steel containing at least 12% chromium has to be used. For a more specific understanding of the type of steel contemplated in the practice of this invention one representative composition is as follows:

| | Percent |
|---|---|
| Carbon | 0.03–0.3 |
| Silicon | 0.1–2 |
| Manganese | 0.1–2 |
| Chromium | 15–20 |
| Nickel | 7–15 |
| Molybdenum | 0.5–4 |

Less than 1.5% of one or more elements selected from the group comprising titanium, columbium, tungsten, vanadium, aluminium and copper. The balance being substantially all iron with usual impurities.

Another example is the common 18–8 chromium-nickel stainless steels and a further example is a similar steel as follows:

| | Percent |
|---|---|
| Carbon | 0.10 |
| Silicon | 1.0 |
| Manganese | 1.0 |
| Chromium | 17 |
| Nickel | 8 |
| Molybdenum | 0.9 (max.) |

Balance iron with usual impurities.

The back of the blade 7 consists of a strip of a hardenable steel with good fatigue properties. Said steel should be of the type containing small quantities of alloying elements including carbon steels and low alloy steels. Such a carbon steel may contain from 0.3 to 1.4%, preferably 0.6 to 1.0% carbon, the balance being iron and the small quantities of alloying elements usual in these steels. With respect to the fatigue properties and the welding properties it has been found of advantage in certain cases to use low alloy steels. Of special advantage are low alloy steels containing at least 1–2% silicon. A small amount of chromium may also be present. The following example gives a representative composition of a steel of this kind:

| | Percent |
|---|---|
| Carbon | 0.65–0.85 |
| Silicon | 1–2 |
| Manganese | 0.5–0.7 |
| Chromium | 0.2–0.5 |

Balance iron with usual impurities.

The high speed steel to be welded to the back of the blade should be in the form of wire 6 or the like. It has been found to be advantageous to use a wire of non-circular or polygonal configuration, having at least one relatively sharp corner, which corner is pressed during the welding operation in the direction towards the edge of the strip constituting the back of the blade. As shown in FIGURES 6 and 7, a thin strip 1 of a stainless or a similar heat resistant steel with high hot hardness and low heat conductivity should be present between said wire and said edge. In this way a better heating of the welding point and thus also a better joint, without local hard brittle cast portions is obtained. As shown in FIGURES 1a, 6 and 7, the wire 6 has in a preferred embodiment a hexagonal section.

It is also important that the dimensions of the wire and the strips to be welded together bear a certain relation to each other. Thus the strip for the back should in cross-section have a thickness less than two-thirds of the maximum thickness of the wire. According to an example the thickness of the said strip 7 was 1.40 millimeters and the thickness between the parallel sides of a hexagonal wire 6 to be welded to said back 2.60 millimeters. The said wire has naturally to be free from oxide and other impurities before the welding. The thin strip 1 of heat resistant steel with high hot hardness and low conductivity e.g. a stainless austenitic steel may have a thickness between 0.08 to 0.30, preferably from 0.12 to 0.20. The said strip consists of a cold rolled material which preferably should be annealed before the welding.

FIGURES 6 and 7 show respectively in cross-section the positions of the wire and strip before and after the welding. As is evident from FIGURE 7, the thin strip of heat resistant steel 1 constitutes a sort of barrier between the wire 6 of high speed tool steel and the edge of the strip 7 constituting the back of the saw blade. The said barrier material prevents the forming of cast portions in the welding joint and contributes also in other respects to the obtaining of a satisfactory welding joint.

The ideal combination of high wear resistance in the teeth and high fatigue life in the saw body is attained when only the teeth or the tips of the teeth are made of the high speed tool steel and the rest of the saw-blade of a steel with better fatigue properties than high speed steel. This is of special importance for metal cutting band saws, other band saws and saw blades which are exposed to bending and other strain. For this kind of saw bands and saw blades only the tip portions of the teeth should comprise of high speed tool steel. The said tip portions of high speed tool steel should be less than two-thirds of the length of the tooth, and preferably between two-tenths of a millimeter to one-half of the length of the tooth and the base portions of the teeth should consist of a hardenable steel with good fatigue properties. If the high speed tool steel extends beyond the gullets the life of such a saw blade will be limited due to fatigue cracks in the gullets. On the other hand it is possible to extend the high speed tool steel beyond the gullets for certain saws which are not exposed to bending and/or other excessive strain.

The operations for making a composite saw blade may be the following: Welding. Heat treatment in connection with the welding. Grinding of the weld, straightening and edge treatment. Forming of the teeth e.g. by milling and setting. Heat treatment of the teeth and the base portion of the saw blade.

The heat treatment of a band saw blade or other saw blades according to the invention and after the forming of the teeth may be the following:

The saw blade is hardened in oil at a temperature of 840° C. to 910° C. and tempered at a temperature of 390° C. to 510° C. directly after hardening. Then the tips of the teeth of high speed tool steel are hardened at a temperature of 1200° C. to 1280° C. and tempered at a temperature of 520° C. to 580° C.

According to another method of heat treatment the saw blade, e.g. a machine saw blade, is hardened at a temperature of 1200° C. to 1280° C. and tempered at a temperature of 520° C. to 580° C.

After the heat treatment the tips of the teeth of high speed tool steel have a hardness of the order of 61 Rockwell C to 68 Rockwell C and the back of the blade and the base portions of the teeth a hardness of the order of 40 Rockwell C to 50 Rockwell C. As a rule the high speed tool steel in the saw blade has a hardness of about 65 Rockwell C and the back of the blade a hardness of about 45 Rockwell C.

Figure 3:
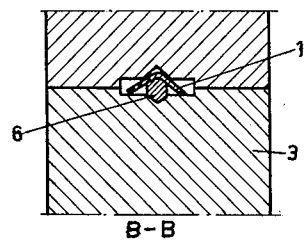
FIGURE 3 is a sectional view on an enlarged scale along the line B—B of FIGURE 1 showing the edges of the rolls introducing the strip of austenitic steel and the wire of high speed tool steel.

The drawings in FIGURES 1 to 4 show how a thin strip 1 of an austenitic steel runs in a slot 4 formed on a roll 2. In the slot there is a deeper slot 5, into which the said strip 1 is forced by a wire of high speed tool steel 6. When the latter enters between the rolls 2 and 3 this causes the strip 1 to be deformed and establish a longitudinal groove therein as shown in FIGURE 3. Thereafter the wire 6 and the strip 1 run together over the roll 3.

Figure 4:
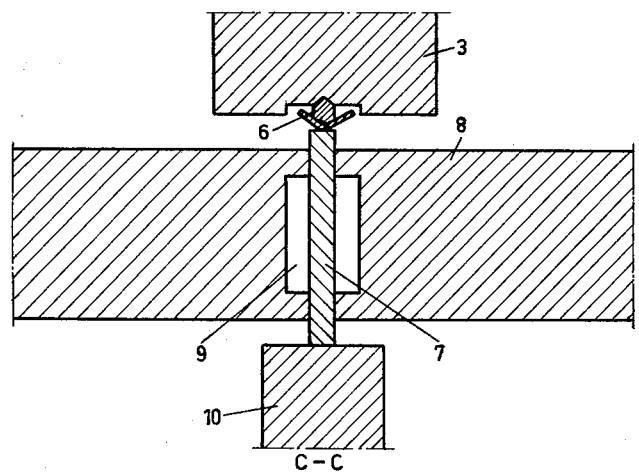
FIGURE 4 is a sectional view on an enlarged scale along the line C—C of FIGURE 1 showing the point where the wire of the high speed tool steel and the thin strip of austenitic steel are brought into contact with strip of a steel containing small quantities of alloying elements, which latter is to form the body of the saw band, to which the wire of high speed steel is to be welded.

FIGURE 4 shows how the grooved thin strip 1 and the wire 6 are brought into contact with a strip of steel 7 containing small quantities of alloying elements, which is to form the body of the saw blade or saw band. The welding current is delivered to the welding point between the strip 7 and the thin austenitic strip 1 and the wire 6 by means of contact or guiding rolls 8 which are provided with slots 9 which have for their purpose to concentrate the transmission of current to a certain point on the strip 7. 10 is a guiding roll which keeps the strip 7 pressed against the austenitic strip 1 running in the slot on the roll 3 and the wire of high speed tool steel 6.

The wire of high speed tool steel 6 is preferably of hexagonal cross section, but, of course, the said wire may be given any other suitable section. By employing a wire 6 of hexagonal section a concentrated transmission of the current to the thin austenitic steel strip 1 and the strip 7 is obtained. The slot 5 in roll 2 has for its purpose to cause the said deformation of the thin austenitic strip, due to which it will be easier to guide so that it is brought with great accuracy into contact with the upper edge of the strip 7.

By introducing such a strip of an austenitic steel between the wire, which is to form the teeth and the strip 7, which is to form the body of the saw band, there is obtained, due to the double contact resistance, a better heating of the welding point at a certain current, and thus also a better alloy in the joint between the wire of high speed tool steel and the strip 7 than would be the case if the said wire strip were directly welded to the strip 7.

Although the invention is illustrated in relation to a band saw blade, it may, of course, also be used for the manufacture of hack saw blades, machine saw blades and circular saw blades.

We claim:

1. The method of making a composite saw blade, the tip portions of the teeth consisting of high speed tool steel and having a hardness of the order of 61 Rockwell C to 68 Rockwell C, the base portions of the teeth and the back of the blade consisting of a hardenable steel with good fatigue properties, said hardenable steel being of the type containing carbon and small quantities of alloying elements and said base portion of the teeth and said back of the blade having a hardness of the order of 40 Rockwell C to 50 Rockwell C, which comprises: butt-welding to the edge of a strip of said hardenable steel a side surface of a relatively thin strip of a heat resistant austenitic steel with high hot hardness and low heat conductivity, and butt-welding to the other side surface of the said heat resistant austenitic steel a wire of high speed tool steel having a thickness greater than that of said strip of hardenable steel, forming teeth extending from the part consisting of high speed tool steel through said thin strip of heat resistant austenitic steel into the part consisting of hardenable steel whereby the base portions of said teeth are formed in said strip of hardenable steel and heat treating the saw blade.

2. The method in accordance with claim 1, in which at least the tip portions of the teeth are hardened at a temperature of the order of 1200° C. to 1280° C. and tempered at a temperature of the order of 520° C. to 580° C.

3. The method in accordance with claim 1, in which the saw blade is hardened at 840° C. to 910° C. and tempered at 390° C. to 510° C., whereafter the tips of the teeth are hardened at 1200° C. to 1280° C. and tempered at 520° C. to 580° C.

4. The method in accordance with claim 1, wherein the wire of high speed tool steel is formed with a section having at least one relatively sharp corner, said corner being pressed towards one edge of the strip consisting of hardenable steel during the welding operation.

5. The method in accordance with claim 4, in which said wire is formed with a cross-section of hexagonal shape.

6. The method according to claim 1, characterized in that the thin strip of heat resistant steel is brought into contact with the wire of high speed tool steel between two rolls, one of which is provided with a slot into which the said strip is forced by the said wire so that the strip is grooved in the longitudinal direction, the said strip and the said wire being together brought into contact with the strip consisting of hardenable steel.

References Cited in the file of this patent

UNITED STATES PATENTS

| | | |
|---|---|---|
| 907,374 | Krabbe | Dec. 22, 1908 |
| 1,535,096 | Blum | Apr. 28, 1925 |
| 2,422,561 | Pavitt | June 17, 1947 |
| 2,683,923 | Replogle | July 20, 1954 |
| 2,799,078 | Craven | July 16, 1957 |